United States Patent [19]
Wagner

[11] 3,863,422
[45] Feb. 4, 1975

[54] BAKING PAN REGISTRATION CONTROL SYSTEM

[75] Inventor: Dale R. Wagner, Richmond, Va.

[73] Assignee: AMF Incorporated, White Plains, N.Y.

[22] Filed: Oct. 9, 1973

[21] Appl. No.: 404,568

[52] U.S. Cl.............................. 53/55, 53/59, 53/67
[51] Int. Cl... B65b 57/08, B65b 57/16, B65b 57/20
[58] Field of Search................ 53/55, 59, 67, 69, 70, 53/73, 74

[56] References Cited
UNITED STATES PATENTS

| | | | |
|---|---|---|---|
| 1,312,640 | 8/1919 | Mallinckrodt | 53/74 |
| 3,447,282 | 6/1969 | Mumma | 53/75 |

*Primary Examiner*—Travis S. McGehee
*Attorney, Agent, or Firm*—George W. Price; Martin Smolowitz

[57] ABSTRACT

A baking pan registration system for aligning a baking pan to receive successive depositions of dough pieces onto selected locations on the baking pan.

9 Claims, 3 Drawing Figures

BAKING PAN REGISTRATION CONTROL SYSTEM

BACKGROUND OF THE INVENTION

Hamburger and frankfurter buns are commercially baked in large flat pans that have a plurality, such as 16, depressions or cups each of which receives a piece of mixed dough. Commercial machinery is available for mixing the dough and for successively dispensing a number of pieces of dough to be deposited in the cups of the baking pan. For example, the dough piece dispenser may operate to simultaneously dispense four dough pieces during each one of successively and regularly occuring dispensing steps. Each group of four dough pieces is present in a row with regularly spaced intervals between the individual dough pieces.

It is desirable to automate as fully as possible the entire baking process of dough preparation and dispensing, the deposition of dough pieces in the baking pans, and the baking of the panned dough pieces. Ideally, it is desired that a continuous succession of pans be brought to the region of the dough piece dispenser and that the pans be automatically passed under the dispenser to fill each cup with a dough piece. The pans may be moved along a conveyor belt whose speed is adjusted so that four successive deposits of dough pieces will fall in the four rows to fill all cups in a pan. This assures that within a given pan the cups are in registration with the deposited dough pieces. However, from one pan to the next succeeding one the distance from the last row of cups of the leading pan to the first row of cups in the following pan often is not the same as the distance between rows of cups within the pans. Furthermore, there is no assurance that successive pans on the conveyor always will have the same spacing therebetween. This means that there is no assurance that successive rows of dispensed dough pieces will fall into successive rows of cups as successive baking pans move along the conveyor. Because of the requirements in the mixing of dough and because of the nature of the mixed dough, it is not always desirable or possible to change the speed of the dough mixing and/or dispensing operation to bring them into registration with the rows of cups as they might appear at the dispensing location.

SUMMARY OF THE PRESENT INVENTION

In the present invention a conveyor line which brings baking pans into registration with the dough piece dispensing means is adapted to run at a high speed and a low speed. The low speed is selected to assure that successive rows of dropped dough pieces fall in successive rows of cups of a baking pan. The conveyor belt moves the pans at high speed until the leading pan is at or near the desired position where the next row of dough pieces will be deposited in the first row of cups in the pan. Sensing means at a fixed position sense when the leading pan is at the desired position and will actuate holding or clamping means to hold the pan until the dispensing means is ready to dispense the next row of dough pieces. At that time, the pan is released to move at the slow speed which is synchronized with the speed of the dough piece dispenser to assure the rows of dough pieces fall into respective rows of cups in that pan. A counter counts the number of dispensed rows of dough pieces required to fill a pan, and when a count is reached which corresponds to a full pan, the control system switches the conveyor to high speed to move the full pan away and to bring the next pan into the desired initial registering position where its presence is sensed by the sensing means, and the above-described process is repeated for this next pan. Should the supply of empty pans on the conveyor be terminated or if an unusually long void space occurs in the supply of pans, means are provided for sensing such a condition and retracting a portion of the conveyor away from under the dough piece dispenser. This prevents the dough pieces from falling on the conveyor in the absence of a pan thereon.

Figure 1:
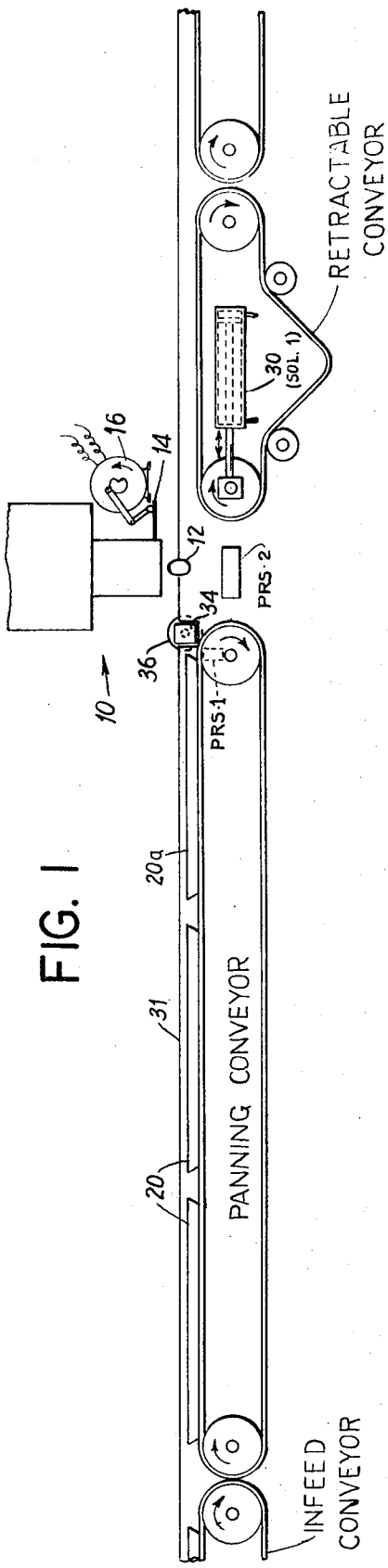
FIGS. 1 and 2 are simplified side and top views, respectively, of a baking pan conveyor system adapted to operate in accordance with the present invention.
Figure 2:
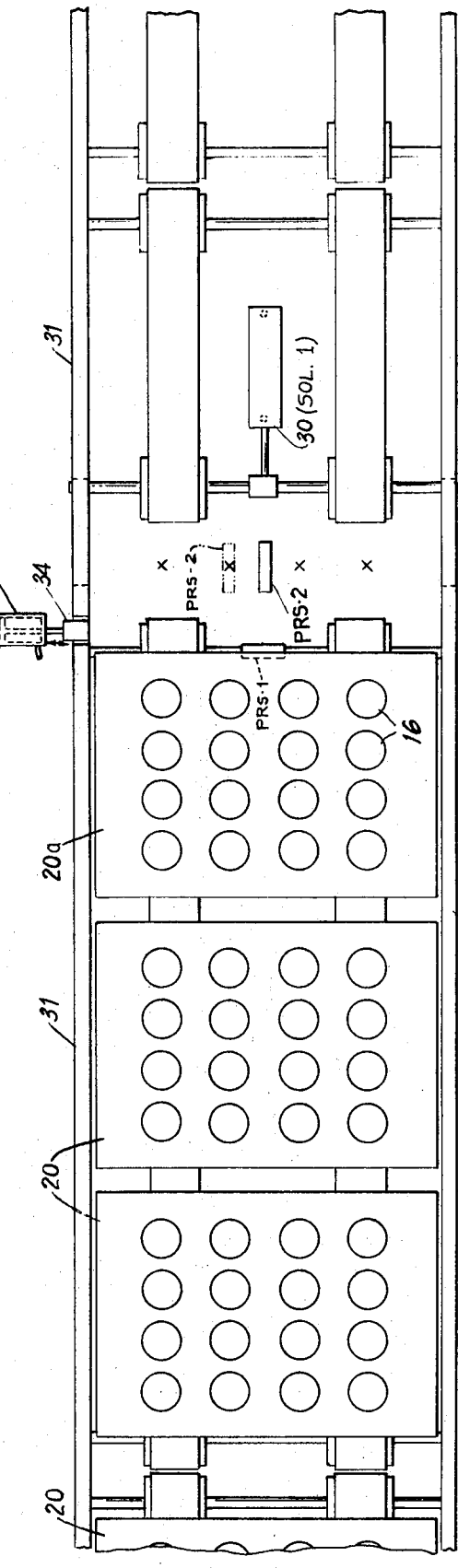

Referring now in detail to FIGS. 1 and 2, a dough piece dispenser is illustrated generally at 10 and may be any one of commercially available equipment which receives mixed dough and dispenses individual dough pieces 12 for deposit in baking pans. In the description of the present invention it will be assumed for the sake of an example that the dough piece of dispenser successively dispenses four dough pieces at a time and that the four dough pieces dispensed at a given time are equally spaced along a row, as indicated by the X's at the center region of FIG. 2. The cutting means 14 that forms the dough pieces may be wire cutters or a knife blade mechanism operated by a motor which rotates at a constant but adjustable speed. Therefore, the successive rows of dispensed dough pieces are regularly occurring with a constant time interval between rows. As an example only, the dispensing means may be an AMF Model 410 PAN-O-MAT dough proofer-moulder, manufactured by the Union Machinery Division of AMF INCORPORATED. Alternatively, the dough piece dispenser may be the type shown and described in copending Pat. application Ser. No. 403,870, entitled "Method and Apparatus for Metering and Shaping Materials" filed Oct. 5, 1973 in the name of Malcolm E. Phillips and assigned to applicant's assignee.

Baking pans 20 in which the dough pieces 12 are to be deposited are brought beneath the dough piece dispensing means 10 by means of a conveyor system that includes an infeed conveyor, a panning conveyor, and the filled pans are moved away by means of a retractable conveyor, to be described in more detail below. As approximate examples only, the infeed conveyor may run at a speed of 30 inches per second, panning conveyor may run at either of two speeds; 22 inches per second, or 15 inches per second. The retractable conveyor is coupled to run at the same high or low speed as the panning conveyor.

Figure 3:
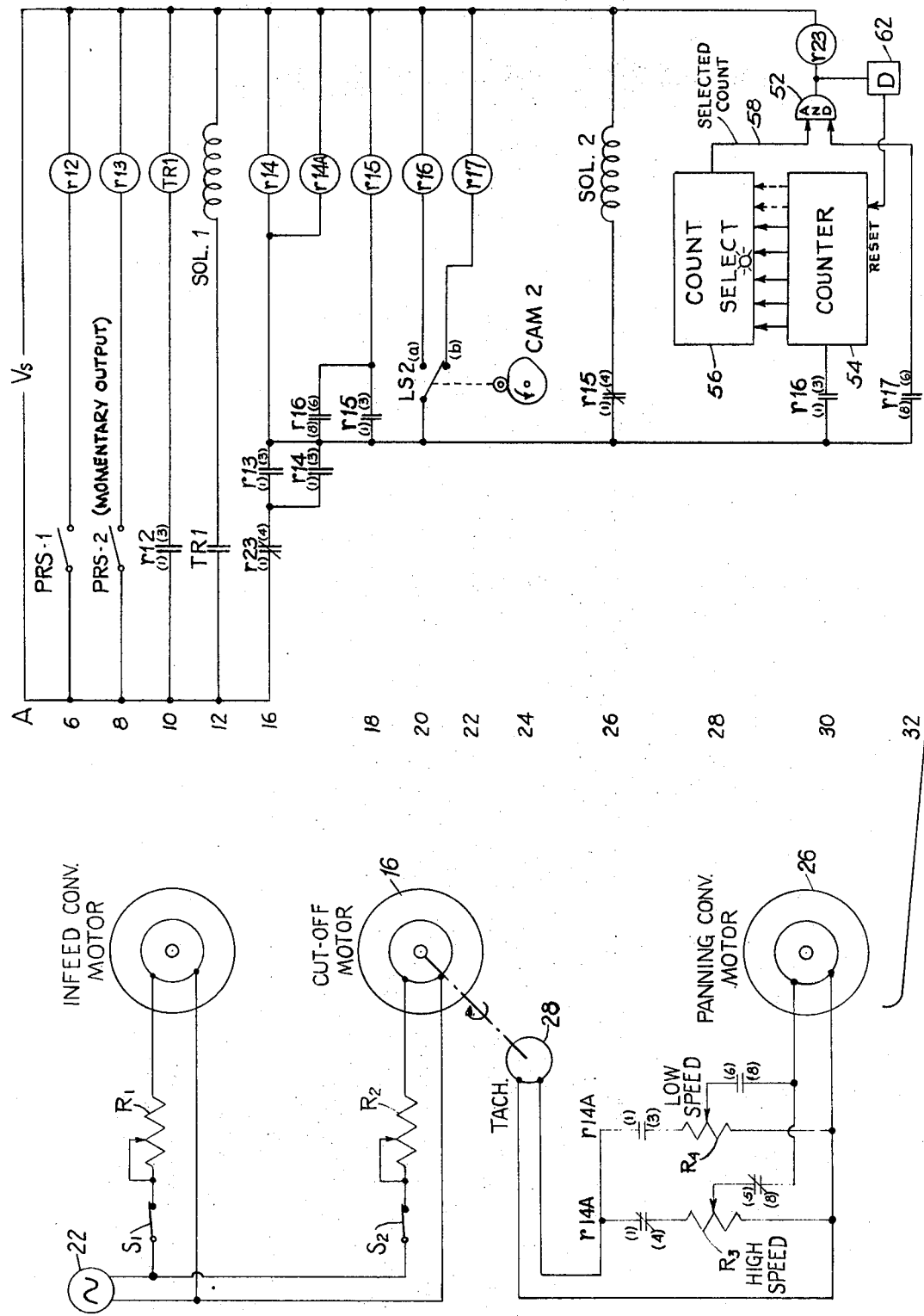
FIG. 3 is a simplified illustration of the control system of this invention for controlling the operation of the conveyor system of FIGS. 1 and 2.

As illustrated in FIG. 3, the infeed conveyor motor is connected to a source of a.c. voltage through a switch $S_1$ and variable resistor means $R_1$ so that it runs at a constant but adjustable speed. Cut-off motor 16 for controlling the dough piece cut off means 14, FIG. 1, is coupled to source 22 through switch $S_2$ and variable resistor means $R_2$ so that the cut off means operates at a constant but selectable rate. The speed of rotation of panning conveyor motor 26, and thus the speed of the panning conveyor, is a function of the speed of cutoff motor 16 since its input voltage is obtained from a tachometer 28 which is mechanically coupled to the output shaft of cutoff motor 16. Additionally, panning conveyor motor 26 will run at a high speed or a low speed depending upon which resistor $R_3$ or $R_4$ is connected in circuit with the motor, as will be described in more detail below. Normally, resistor $R_3$ is in circuit with the panning conveyor motor 26 so that the panning conveyor normally runs at its higher speed, i.e., in the absence of pans 20 at the dispensing means. In practice, used with panning conveyor motor 26 is a servo motor controller designated model number NC 104 B, supplied by Control Systems Research, Inc., 1118 Main St., Pittsburg, Pa.

Retractable conveyor is coupled to the drive means of the panning conveyor by conventional means such as chains and sprockets so that their speeds are the same, either high or low. The pulley wheel or sprocket wheel of the retractable conveyor which is closest to the panning conveyor is retractable to the position illustrated in FIG. 1 by means of a solenoid actuated pneumatic piston and cylinder 30. In the normal position, the piston is retracted as illustrated in FIG. 1.

Pans 20 are carried on the respective conveyors between guide rails 31 and 32 which are fixed along opposite sides of the conveyors. Disposed in guide rail 31 at or near the region where dough pieces 12 are dropped is a clamping or holding means 34 which may be a block of rubber or other elastomeric material, and which is transversely movable by means of a solenoid actuated piston and cylinder 36. When clamping means 34 is in its extended position it pushes against an edge of a pan 20 and forces the pan into clamping or stopping engagement with the other guide rail 32. In this condition the conveyor slides across the bottom of a clamped pan 20. Upon release of clamping means 34, a formerly clamped pan 20 resumes moving in synchronism with the panning conveyor.

A proximity sensor PRS-1 senses a pan 20 when a pan is slightly upstream of the region where dough pieces 12 are dropped by dispensing means 10, and a second proximity sensor PRS-2 senses the leading edge of a pan 20 when the pan is adjacent clamping means 34. Any suitable type of proximity sensor may be used for the two proximity sensors. I presently prefer to use an eddy current type of sensor model number FMSA4-6 with a dual proximity amplifier model number FMA112-A1-DC, (with one maintained output and one momentary output) both obtained from Micro Switch, Division of Honeywell, Freeport, Ill.

In the operation of the system, reference will be made to the control system illustrated in FIG. 3, as well as to the above-described FIGS. 1 and 2. Assuming that dough piece dispensing means 10 is dispensing a row of four pieces of dough each regularly occurring time interval, and further assuming that the first baking pan 20a having the 16 cups therein is approaching proximity sensor PRS-1 moving at the high speed of the panning conveyor, as soon as PRS-1 (illustrated schematically in FIG. 3 as an on-off switch) senses pan 20a, relay r12 is energized, see line A6 of the wiring schematic of FIG. 3. Contacts 1 and 3 of relay r12 now close, line A10, to energize a delay on release time delay relay TR1. The contacts of relay TR1 close, line A12, and energize solenoid SOL1 associated with pneumatic piston and cylinder 30, FIG. 1, on the retractable conveyor. The piston is moved to its extended position to close the gap between the retractable conveyor and the panning conveyor. The time delay on release of relay TR1 is so chosen that the retractable conveyor will remain closely adjacent the panning conveyor so long as there is not a great void in the supply of baking pans arriving at proximity sensor PRS-1.

Pan 20a continues moving at a high speed of the panning conveyor and then encounters proximity sensor PRS-2 which is activated to produce a momentary output, line A8, to cause relay r13 to be momentarily energized. Contacts 1 and 3 of relay r13 momentarily close, line A16, and relays r14 and r14A are energized since contacts 1 and 4 of relay r23 are in their normally closed positions. Relays r14 and r14A are locked in by the closure of contacts 1 and 3 of relay r14, see line A17.

When contacts 1 and 3 of relay r14 close at line A17, solenoid SOL2, line A26, also is energized since contacts 1 and 4 of relay r15 are normally closed. Solenoid SOL2 is associated with the pneumatic piston and cylinder 36 of the pan clamping means 34 and when SOL2 is energized the piston extends to push pan 20a against guide rail 32 and hold it there in a stopped position.

Energization of relay r14A opens its normally closed contacts 1, 4 and 5, 8 at the input of panning conveyor motor 26 to disconnect the high speed resistor R3 and closes contacts 1, 3 and 6, 8 to connect low speed resistor R4 in circuit with motor 26, thus causing the panning conveyor to change to its low speed of travel.

Continuing with the description and looking now at lines A20–26 of the wiring diagram of FIG. 3, cam 2 continuously rotates in synchronism with the shaft of cutoff motor 16 and the high portion of the cam is positioned to change the contact closures of switch LS 2 at or near the time that the dough piece dispensing means 10 releases a row of four dough pieces. In the illustrated position of cam 2, the cam follower is on the low portion of the cam surface and relay r17 is energized by way of the now closed contacts 1 and 3 of relay r14 and the normally closed contacts 1 and 4 of relay r23. Contacts 6 and 8 of relay r17 close at line A32 and energize one input to AND gate 52 but nothing passes the gate because its other input is not energized since the desired count of four successive rows of dough piece deposits has not yet been reached. No other switching occurs at this time. This is the desired operating sequence since dough pieces have not yet been dispensed by dispensing means 10.

When cam 2 rotates further so that the cam follower is on the high portion of the cam, this occuring when the dough piece dispenser 10 is dispensing its first row of four dough pieces, switch LS 2 is moved to its upper contact and relay r16 is energized. Contacts 8 and 6 of relay r16 close at line A17 and because relays r13 and r14 now are energized relay r15 also is energized and is locked in by its contacts 1 and 3. The normally closed contacts 1 and 4 of relay r15, line A26, now open to deenergize SOL2 and cause clamping means 34, FIG. 2, to be retracted to release pan 20a. The first row of dough pieces 12 fall into the first row of cups of the pan at or slightly after the time it commences its forward motion at the slow speed of the panning conveyor.

Energization of relay r16 also closes its contacts 1 and 3 on line A30 and provides an input signal to counter 54 which responds thereto to store or register a count of one. Counter 54 may take any form but is assumed in this description to be a cascade of bistable multivibrator circuits which is conventional and commonly used in the art. The outputs leads of the respective stages of the counter are coupled to a count select circuit 56 which may be a logic or selectable switching circuit which permits the coupling of an output signal to output line 58 only when counter 54 has registered some desired and selected count, which in this example is a count of four. Output line 58 of the count select circuit 58 is energized so long as counter 54 is registering the desired count.

Cam 2 continues to rotate and the cam follower falls to the low portion of the cam so that switch LS 2 opens its upper contact *a* and closes its lower contact *b*. Relay *r*16 thus is deenergized, but relay *r*15 remains energized because it is locked in by its own contacts 1 and 3 at line A18. Relay *r*17 is again energized by switch LS 2 and its contacts 8 and 6 close at line 32, but again nothing passes AND gate 52 because the desired count of four has not yet been registered in counter 54.

The operation of cam 2, switch LS 2, relays *r*16 and *r*17, and counter 54 repeat the operation just described as pan 20*a* moves under dough piece dispensing means 10 and the next three deposits of four dough pieces each are made. At the conclusion of the fourth deposit, which fills all cups in pan 20*a*, counter 54 registers a count of four and count select circuit 56 causes its output line 58 to be energized. Then when cam 2 rotates so that the cam follower is on the low portion of the cam switch LS 2 switches to its *b* contact to energize relay *r*17 and close its contacts 6 and 8 at line A32. Both inputs to AND gate 52 now are energized and a signal is passed to energize relay 23. After a short delay in delay means 62 the output of AND gate 52 is coupled back to reset counter 54 to zero.

The normally closed contacts 1 and 4 of relay *r*23 at line 16 now are open and relays 14, 14A, 15, 16, 17 and 23 all become deenergized. Although contacts 1 and 4 of relay *r*23 again close at line 16, contacts 1 and 3 of relay *r*13 remain open because the next empty pan has not yet reached proximity sensor PRS-2 and relay *r*13 at line 8 remains deenergized. Furthermore, although the normally closed contacts 1 and 4 of relay *r*15 are now closed at line A26, SOL2 is not energized at this time because the contacts of relays *r*13 and *r*14 at lines A16 and A17 are open.

When relay *r*14A is deenergized by the opening of contacts 1 and 3 of relay *r*23 at line A16, the *r*14A contacts in the speed control circuit of panning conveyor motor 26 change so that normally closed contacts 1, 4 and 5, 8 again close to connect high speed resistor R₃ in circuit, while contacts 1, 3 and 6, 8 open to disconnect low speed resistor R₄, thus causing panning convey motor to rotate at its higher speed to bring the next empty pan into position to be sensed by proximity sensor PRS-2. At this time the above-described operation repeats, except for the operation of the retractable conveyor which remains in its extended position.

The operation described above is but one specific example of the capabilities of the apparatus of the present invention and it is to be understood that the apparatus is not limited to use with baking pans having 16 cups arranged in four rows of four cups or to a dough piece dispenser which dispenses only one row of dough pieces at a time. For example, if the baking pan had three rows of four cups each, by changing the count select means 56 in FIG. 3 to select a count of three the apparatus would function substantially as described to fill three rows of four cups and then its sequence of operation would repeat at the conclusion of the deposition of dough pieces in the third row of each pan.

Furthermore, the dough piece dispensing means may dispense two rows of dough pieces at one time rather than one as described above. In such an instance, assuming that the pans 20 were of the same type illustrated and described in connection with FIGS. 1–3, the count select means 56 would be set for a count of two. In the operation of this example, the panning conveyor would be moving at its fast speed and a pan 20 would be sensed by PRS-1 and the retractable conveyor would be extended by SOL1 and piston and cylinder 30 just as described previously. Similarly, when the leading edge of the pan is sensed by PRS-2, clamping means 34, actuated by SOL2, will hold the pan stopped and panning motor 26 will be switched to its slow speed by energization of relay *r*14A. Then when cam 2 revolved so that the cam follower is on the high portion of the cam to close contact *a* of switch LS 2, the pan would be released and the first two rows of cups would be filled with dough pieces by one dispensing step of dough piece dispenser 10. The panning conveyor would continue moving the pan at its slow speed and the next two rows of cups would be simultaneously filled by the next dispensing step of dough piece dispensing means 10. At this time the output of count select means 56 would be energized and when relay *r*17 is energized by the further revolution of cam 2, a signal passes AND gate 52 to energize relay *r*23 to terminate the sequence of operation for that pan and to reset the control system, except for the operation of PRS-1, relay *r*12 and solenoid SOL1.

It will be appreciated that in the types of operations mentioned thus far it is required that proximity sensor PRS-2 sense only the leading edge of each pan in order to assure that relays *r*13, *r*14, *r*14A and *r*15 are energized just once for each pan. This assures that SOL2 and pan clamping means 34 are actuated just once for each pan and that panning conveyor motor 26 changes speed just once for each pan.

Yet another mode of operation is possible with the system illustrated in FIGS. 1–3 and further demonstrates the universal adaptability of the system. In the dispensing and panning of frankfurter buns, for example, the cups in the pans are elongated in the direction of travel of the panning conveyor and the dough pieces are elongated finger-like pieces of dough. In this instance the dough pieces are not free falling from the dough piece dispenser 10 as they were in the case of hamburger buns, but the bottom end of the dough pieces contact the leading edges of the cups and are deposited along the elongated cups while the pans are moving and before the cut off means 14 cuts the dough pieces to size. In this type of operation it is more difficult to obtain correct registration of the dispensed dough pieces in successive rows of cups while the pans are moving at one continuous slow speed of the panning conveyor. To more accurately assure proper registration of the dispensed frankfurter dough pieces with the cups, count select means 56 in FIG. 3 is set for a count of one. Then each row of cups of each pan will be separately sensed and indexed or registered to assure proper deposition of the elongated dough pieces in the elongated cups of each row. In other words, the programmed sequence of operation of the control system will be just as described above except that relay r23 will be energized after a count of one in counter 54 and after cam 2 causes switch LS 2 to close on its b contact so that contacts 8 and 6 of relay r12 cause AND gate 52 to pass a signal. One slight adjustment of the apparatus illustrated in FIGS. 1 and 2 must be made in order to obtain this type of operation where the selected count is one. In this instance, proximity sensor PRS-2 must be located to either side of the position illustrated in FIG. 2 and adjusted so that it now will sense each row of cups in the pan rather than the leading edge of each pan as in the prior examples. This position of proximity sensor PRS-2 is illustrated in broken lines in FIG. 2. Briefly, this mode of operation is as follows, again assuming a plurality of rows of cups in each pan.

Count select means 56, FIG. 3, is set at one count, and assuming that proximity sensor PRS-1 already has sensed the first pan and has caused the retractable conveyor to be extended into operating position, proximity sensor PRS-2 next senses the first row of cups in the pan and energizes relay r13 at line A8 to cause its contacts 1 and 3 at line A16 to close. Relays r14 and r14A are energized to switch high speed resistor R3 out of circuit with panning conveyor motor 26 and switch in low speed resistor R4, thus causing the panning conveyor to move at its low speed. Assuming that cam 2 is at the position illustrated, relay r17 is energized through the b contact of switch LS 2 to close contacts 8 and 6 of relay r17 at line A32. AND gate 52 will not pass a signal because output line 58 of count select means is not energized. Simultaneously, solenoid SOL2 is energized through normally closed contacts 1 and 4 of relay r15 at line A26 to actuate piston and cylinder 36 and cause clamping means 34 to hold the pan 20a against rail 32 in a stopped position with the first row of cups at the desired position relative to dispensing means 10.

When cam 2 rotates so that its high portion moves the cam follower upwardly to close contact a of switch LS 2, this being in synchronism with the dispensing of the dough pieces of a given row of dough pieces, relay r16 is energized to close its contacts 8 and 6 at line A17 and its contacts 1 and 3 at line A30. Relay r15 is thus energized and its contacts 1 and 4 at line A26 open to deenergize solenoid SOL2 to withdraw clamping means 34 and release pan 20a to receive the dough pieces.

Counter 54 simultaneously receives a count through closed contacts 1 and 3 of relay r16 and because count select means 56 is set at a one count, output line 58 is energized. As cam 2 rotates further the cam follower will fall to the low part of the cam to close contact b of switch LS 2 and energize relay 17 and close its contacts 8 and 6 at line A32. The inputs of AND gate 52 now are energized in coincidence to pass a signal to energize relay r23. Contacts 1 and 4 of relay r23 open at line A16 to deenergize all relays therebelow, thus resetting the control system and switching panning conveyor motor 26 back to its high speed.

Proximity sensor PRS-2 then senses the next row of cups in the pan and the above sequence of operation is repeated to place the second row of cups in position to properly receive the next deposit of elongated dough pieces. This sequence of operation continues as long as pans are present on the panning conveyor. It is evident that in this mode of operation proximity sensor PRS-2 "sees" only rows of cups and does not "see" individual pans. Accordingly, the programmed sequence of operation is based on individual rows of cups rather than individual pans or a plurality of rows of cups in a pan.

The pattern of each deposit of dough pieces may be other than a straight line. For example, it may be one or more clusters of dough pieces along a row. Additionally, the deposited pattern of dough pieces may constitute a cluster or plurality of elongated dough pieces deposited at one time in a single bread pan for the baking of so called break-apart bread. In this case, count select means will be set to a count of one and proximity sensor PRS-2 will be adjusted and arranged to sense each successive bread pan.

What is claimed is:

1. In a baking pan registration control system for controlling the positioning and movement of baking pans to deposit dough pieces at one or more predetermined locations on each pan, the combination comprising dough piece dispensing means for repetitively dispensing dough pieces which are deposited in a given pattern on each dispensing action, a pan conveyor for conveying baking pans to receive dispensed dough pieces, conveyor motor means for moving said conveyor at selectable speeds which are functions of the dispensing rate of the dough piece dispensing means, means for sensing the arrival of a designated portion of a pan at a predetermined location at or adjacent the dispensing means, means for establishing a programmed deposition of dough pieces, means operating in response to said sensing means and to said dispensing means for positioning and moving a pan to receive dough pieces at said predetermined locations in accordance with said programmed deposition of dough pieces, means for monitoring the deposition of dough pieces and for determining the conclusion of the programmed deposition, and means operable in response to said last named means and at the conclusion of the programmed deposition for conditioning said system to respond according to the programmed deposition upon sensing a subsequently appearing designated pan portion at said predetermined location.

2. In a baking pan registration control system for controlling the position and movement of each one of a succession of baking pans to receive dispensed dough pieces at one or more predetermined locations on each pan, the combination comprising dough piece dispensing means for dispensing dough pieces in a given pattern and at regularly occurring intervals, means for programming the dispensing dough pieces for each pan, a pan conveyor for conveying said baking pans one at a time to receive dispensed dough pieces, conveyor motor means for selectively moving said conveyor at selectable speeds which are functions of the dispensing rate of the dough piece dispensing means, one of said speeds being an initial speed, means for sensing the arrival of one or more designated portions of each of said pans at a predetermined location at or adjacent the dispensing means, means operating in response to said sensing means and to said dispensing means to hold a sensed designated portion of the pan at said predetermined location until the dispensing means is conditioned to dispense a pattern of dough pieces, means operating in response to the sensing of a designated portion of a pan and coupled to said conveyor motor means for controlling the speed of the conveyor to positioning said one or more predetermined locations to register with dispensed dough pieces, means operating in response to the sensing of the designated portion of the pan and to the dispensing means for monitoring a programmed dispensing of dough pieces, means for determining the conclusion of said programmed dispensing of dough pieces, and means operative at the conclusion of the programmed dispensing for returning the speed of the conveyor to its initial speed and for conditioning the system to respond as described to a next designated pan portion to be sensed.

3. In a baking pan registration control system for controlling the positioning and movement of a succession of baking pans to receive deposited dough pieces at predetermined locations on each pan, the combination comprising dough piece dispensing means for repetitively dispensing dough pieces onto a baking pan in a given pattern at each deposit thereof, a pan conveyor for conveying baking pans to receive dispensed dough pieces, conveyor motor means for moving said conveyor at selectable speeds which are functions of the dispensing rate of the dispensing means, means for sensing the arrival of a designated portion of a pan at a predetermined location at or adjacent the dispensing means, means operable in response to said sensing means and said dispensing means, and including means for controlling said motor means, for successively positioning preselected ones of said locations on said pan to receive successively occurring deposits of dough pieces, means for determining when all predetermined locations on a pan have received dough pieces, and reset means operable in response to said last named means for conditioning the system to respond as described in response to the next sensing of a designated pan portion by the sensing means.

4. The combination claimed in claim 3 wherein said means controlling the motor means includes counter means for counting the number of patterns deposited by the dispensing means, means for selecting a desired count registered in said counter means, means responsive to said sensing means for causing the motor means to move the conveyor at one speed after a designated portion of a pan is sensed, and means responsive to the means for selecting a desired count for causing the motor means to move the conveyor at a second speed after said desired count is registered in the counter means.

5. In a baking pan registration control system for controlling the position and movement of a baking pan to receive dispensed dough pieces at predetermined locations on the pan, the combination comprising dough piece dispensing means for dispensing dough pieces onto a baking pan in a given pattern at each one of regularly occuring intervals, means for establishing a programmed dispensing of dough pieces, a pan conveyor for conveying baking pans to receive dispensed dough pieces, conveyor motor means for selectively moving said conveyor at either one of first or second speeds both of which are functions of the dispensing rate of the dough piece dispensing means, means for sensing the arrival of a designated portion of a pan at a predetermined location at or adjacent the dispensing means, means operating in response to said sensing means and to said dispensing means for holding the sensed portion of the pan at said predetermined location only until the dispensing means is conditioned to dispense a next pattern of dough pieces, means operating in response to said sensing of a designated portion of a pan and coupled to said conveyor motor means for changing the speed of the conveyor from its first speed to its second speed thereby to move the pan at said second speed when it is free to move on the conveyor, means operating in response to the sensing of the designated portion of the pan and in response to the dispensing means for monitoring said dispensing of dough pieces, means for determining the conclusion of said programmed deposition of dough pieces, and means operative at the conclusion of the programmed deposition for returning the speed of the conveyor to its first speed and for conditioning the system to respond as described to a next sensed designated pan portion.

6. The combination claimed in claim 5 wherein said baking pans include a plurality of dough piece receiving cups arranged in a plurality of rows that extend transversely to the direction of movement of the pan conveyor, and wherein said sensing means is adapted and arranged to sense the arrival of each row of cups at said predetermined location.

7. The combination claimed in claim 5 wherein said sensing means is adapted and arranged to sense only the arrival of each one of a succession of pans at said predetermined location.

8. The combination claimed in claim 5 wherein said means for monitoring said programmed dispensing of dough pieces comprises, counter means operable in response to the dispensing of each pattern of dough pieces for counting the number of patterns dispensed, and wherein the means for determining the conclusion of said programmed dispensings includes means coupled to said counter means for producing an output signal after a predetermined number of counts have been registered in the counter means.

9. In a baking pan registration control system for controlling the position and movement of each one of a succession of baking pans, comprising dough piece depositing means for depositing a pattern of dough pieces at each one of regularly occuring deposits, a pan conveyor for conveying a succession of baking pans to receive deposited dough pieces, conveyor motor means for selectively moving said conveyor at either a fast or slow speed both of which are functions of the depositing rate of said depositing means, means for sensing the arrival of a designated portion of a pan at a predetermined location proximate said depositing means, means operating in response to the sensing of a designated portion of a pan and coupled to said conveyor motor means for changing the speed of the conveyor from its fast speed to its slow speed, means operating in response to the sensing of a designated portion of a pan and in response to the depositing means for holding the sensed portion of a pan at said predetermined location until the depositing means is in the process of depositing a next pattern of dough pieces, means for counting the number of dough piece patterns deposited since the last sensing of a designated portion of a pan, means for selecting a desired count in said counting means and for producing an output signal when said count is reached in the counting means, means responsive to said output signal for changing the speed of said conveyor back to its fast speed and for resetting said counting means to an initial count.

* * * * *